United States Patent
Schindler et al.

(10) Patent No.: US 11,046,144 B2
(45) Date of Patent: Jun. 29, 2021

(54) TORSION BAR FOR A STABILISER OF A MOTOR VEHICLE, AND STABILISER AND METHOD FOR PRODUCING A STABILISER

(71) Applicant: AUDI AG, Ingolstadt (DE)

(72) Inventors: Sebastian Schindler, Ingolstadt (DE); Carsten Bär, Ingolstadt (DE)

(73) Assignee: AUDI AG, Ingolstadt (DE)

(*) Notice: Subject to any disclaimer, the term of this patent is extended or adjusted under 35 U.S.C. 154(b) by 36 days.

(21) Appl. No.: 16/613,485

(22) PCT Filed: Feb. 26, 2018

(86) PCT No.: PCT/EP2018/054676
§ 371 (c)(1),
(2) Date: Nov. 14, 2019

(87) PCT Pub. No.: WO2018/215099
PCT Pub. Date: Nov. 29, 2018

(65) Prior Publication Data
US 2021/0086580 A1    Mar. 25, 2021

(30) Foreign Application Priority Data

May 23, 2017   (DE) ............... 10 2017 208 757.9

(51) Int. Cl.
*B60G 21/055*  (2006.01)
*B60G 11/20*   (2006.01)

(52) U.S. Cl.
CPC ............ *B60G 21/055* (2013.01); *B60G 11/20* (2013.01); *B60G 2202/135* (2013.01);
(Continued)

(58) Field of Classification Search
CPC ............ B60G 21/055; B60G 2204/422; B60G 2202/135; B60G 2206/71;
(Continued)

(56) References Cited

U.S. PATENT DOCUMENTS

| 5,601,493 A | 2/1997 | Nakazono et al. |
| 6,863,763 B2 | 3/2005 | Lee et al. |
| 10,232,678 B2 * | 3/2019 | Kuroda ............ F16F 15/08 |

FOREIGN PATENT DOCUMENTS

| CN | 202936363 U | 5/2013 |
| DE | 195 42 523 A1 | 5/1997 |

(Continued)

OTHER PUBLICATIONS

Examination Report dated Apr. 25, 2018 in corresponding German application No. 10 2017 208 757.9; 17 pages.

(Continued)

*Primary Examiner* — James A English
*Assistant Examiner* — Daniel M. Keck
(74) *Attorney, Agent, or Firm* — Maier & Maier, PLLC

(57) ABSTRACT

A torsion bar for a stabiliser of a motor vehicle, on the axial ends of which a respective stabiliser limb can be rotationally fixed. In the region of the axial ends thereof, the torsion bar is coated with an adhesive coating and a protective layer covering the adhesive coating, wherein the adhesive coating is designed as a solid adhesive coating that can be activated after at least partial removal of the protective layer.

20 Claims, 2 Drawing Sheets

(52) U.S. Cl.
CPC .. *B60G 2204/422* (2013.01); *B60G 2206/427* (2013.01); *B60G 2206/71* (2013.01); *B60G 2206/7101* (2013.01); *B60G 2206/821* (2013.01)

(58) Field of Classification Search
CPC ...... B60G 2206/7101; B60G 2206/821; B60G 2206/84; B60G 2206/427; B60G 21/0551; B60G 21/052; B60G 11/20; B29C 65/48; B29C 65/00; B29C 66/3032; B29C 66/30321
See application file for complete search history.

(56) References Cited

FOREIGN PATENT DOCUMENTS

| DE | 196 13 857 A1 | 10/1997 | |
|---|---|---|---|
| DE | 10 2007 001 253 A1 | 11/2007 | |
| DE | 10 2009 047 671 A1 | 6/2011 | |
| DE | 10 2011 118 513 A1 | 5/2013 | |
| DE | 10 2012 008 995 A1 | 9/2013 | |
| DE | 10 2013 111 703 A1 | 4/2015 | |
| DE | 10 2013 225 861 A1 | 6/2015 | |
| DE | 102016012350 A1 * | 4/2018 | ............. B29C 65/10 |
| EP | 0 500 329 A2 | 8/1992 | |
| EP | 1036680 A2 | 9/2000 | |
| WO | 2006/042988 A1 | 4/2006 | |
| WO | 2008/028224 A1 | 3/2008 | |
| WO | 2016/109199 A1 | 7/2016 | |

OTHER PUBLICATIONS

International Search Report and Written Opinion of the International Searching Authority dated Jun. 5, 2018 in corresponding International application No. PCT/EP2018/054676; 40 pages.
Hermann Onusseit, "Adhesive Technology—Basic Principles", Jan. 1, 2012, Beuth Verlag, pp. 95-98; 4 pages.
3M, "3M Automotive Structural Adhesive Films SAF6045", Aug. 1, 2002; URL:http://multimedia.3m.com/mws/media/1723330/3m-structural-adhesive-6045.pdf; 4 pages.
3M, "Structural Adhesive Film SAF6068"; URL:http://multimedia.3m.com/mws/media/5723440/3mtm-structural-adhesive-film-saf6068.pdf; 4 pages.
ip.com Journal, "Method of automatic application of adhesive film, e. g. structural adhesive film" Apr. 4, 2016; 3 pages.
Notification of Transmittal of Translation of the International Preliminary Report on Patentability dated Dec. 5, 2019, in connection with corresponding international Application No. PCT/EP2018/054676 (11 pgs.).

* cited by examiner

TORSION BAR FOR A STABILISER OF A MOTOR VEHICLE, AND STABILISER AND METHOD FOR PRODUCING A STABILISER

FIELD

The disclosure relates to a torsion bar for a stabiliser of a motor vehicle.

BACKGROUND

U-shaped stabilisers for motor vehicles having a fiber-composite torsion bar extending essentially along the vehicle's transverse direction (Y-axis) in the installed state, as well as metallic stabiliser limbs, the axial ends of which are rotationally fixed, extending essentially in the vehicle's longitudinal direction (X direction) are well-known from the prior art; cf. DE 10 2012 008 995 A1. According to the teaching of this publication, the shaft-hub connection between the torsion bar and the stabiliser limb is established in that the torsion bar is pressed onto the hub, which has inner toothing, with material displacement. In addition to the form-fitting connection, an adhesive bond is created by means of an adhesive connection. To this end, a liquid adhesive is preferably applied between the tooth flanks such that said adhesive fills in the material-free space that develops during the press-on process. The adhesive, which is applied in liquid form to the parts to be connected, thus particularly serves as a lubricant during the press-on process as well as corrosion protection after the adhesive is cured. This has been proven to be disadvantageous such that the liquid adhesive generates extensive adhesive erosion, which must be elaborately cleared away after a certain quantity and thus necessitates an interruption in production or lands on the floor of the production facility as debris, which is problematic for DIN-certified production.

SUMMARY

The object of the invention is to further develop a torsion bar for a stabiliser of a motor vehicle such that a simplified production of a stabiliser for a motor vehicle is enabled, which causes less debris erosion and is optionally DIN-certified.

It is provided, in a known form and manner, that a stabiliser limb can be rotationally fixed at the axial ends of the torsion bar. In the mounted state, the torsion bar is essentially aligned in the vehicle's transverse direction (Y direction) in this case, and the stabiliser limbs extend essentially in the vehicle's longitudinal direction (X direction).

Preferably, the torsion bar is hollow-cylindrical and formed from a fiber-composite material, while the stabiliser limbs are produced from a light metal alloy, particularly an aluminum alloy.

According to the invention, it is provided that the torsion bar is coated with an adhesive coating in the area of the axial ends thereof and a protective layer covering the adhesive coating, wherein the adhesive coating is formed as a solid adhesive coating, which can be activated after at least partial removal of the protective layer.

The design according to the invention has proven to be particularly advantageous, because no liquid adhesive erosion occurs during production of the stabiliser due to the solid physical state of the adhesive coating, with the result that a quicker, interruption-free, and particularly also DIN-certified production of the stabiliser is enabled.

Preferably, the adhesive coating comprises polyurethanes, silicones, MS polymers, epoxide resins, rubber, and/or acrylate as the adhesive component.

According to an especially preferred embodiment, the adhesive coating is in the form of a multi-component adhesive, wherein at least one of the adhesive components is present in microencapsulated form.

Preferably in this case, the adhesive component can be activated by means of a mechanical bursting of the microcapsule, the input of heat, solvents, and/or moisture.

Preferably, the protective layer is formed from a form-stable material, particularly from a polyolefin thermoplastic.

The object upon which the invention is further based is to provide a method for producing a stabiliser for a motor vehicle, which enables a simplified production of a stabiliser for a motor vehicle, which causes less debris erosion and is optionally DIN-certified.

An exemplary method according to the disclosure comprises the following steps:

- provision of a torsion bar according to the invention
- provision of two stabiliser limbs each having a hub bore
- joining of the torsion bar with the stabiliser limbs by inserting the axial ends of the torsion bar into the hub bore of the stabiliser limbs, wherein the hub bores placed in the stabiliser limbs and the axial ends of the torsion bar are dimensioned and/or have a fit such that the protective layer is at least partially removed and thus the adhesive coating arranged under the protective layer is at least partially exposed during insertion of the axial ends of the torsion bar into the assigned hub bores such that the at least partially exposed adhesive layer has contact with the hub bore
- activation of the at least partially exposed adhesive coating.

The essential advantage of the method is that the problems known from the prior art no longer occur due to the dry joining/adhesive method such that a production method is provided that is free of debris and thus also optionally DIN-certifiable.

In order to prevent, to the extent possible, material erosion of the protective layer into the adhesive coating underneath during joining of the components, the material erosion occurring during insertion of the axial ends of the torsion bar into the hub bore of the stabiliser limbs is suctioned off.

Preferably, a form-fitting connection is additionally established in the area of the joint between the torsion bar and the stabiliser limbs during joining of the torsion bar with the stabiliser limbs. Because a form-fitting connection then exists between the torsion bar and the stabiliser limbs in addition to the adhesive bond connection, an especially operationally-safe connection is ensured between the components.

Preferably, it is provided for this that the hub bore of the stabiliser limbs has inner toothing such that an external-tooth-like contour is cut into the protective layer during the joining process.

According to an especially preferred embodiment, it is provided that the protective layer is provided already having an external-tooth-like contour corresponding to the inner toothing. The inner toothing present in the hub bore and the external-tooth-like contour of the protective layer in this case are matched to one another in the dimensioning thereof such that the tooth tips of the inner toothing cut into the protective layer in the area between two teeth of the external-tooth-like contour and thus expose the adhesive coating in this area during joining, i.e. during axial insertion of the ends of the torsion bar into the respectively assigned hub bore.

In addition, it is conceivable that a force-fitting connection is also established between the torsion bar and stabiliser limb components during joining, in addition to the previously mentioned adhesive and form-fitting connection.

The activation of the adhesive component of the adhesive coating preferably takes place by means of mechanical bursting of the microcapsule, particularly caused by axial insertion of the axial ends of the torsion bar into the hub bore of the stabiliser limbs, and/or due to heat input and/or the supplying of a solvent and/or supplying of moisture.

To ensure complete curing of the adhesive connection between the torsion bar and the stabiliser limb, swapping out of the joined stabiliser may be provided as a further method step.

A further exemplary object upon, which the disclosure is based is to refine a stabilizer for a motor vehicle such that a simple production is ensured with a low component weight of the stabiliser and an operationally-safer connection between the torsion bar and the stabiliser limbs.

In a known form and manner, the stabiliser has a substantially U-shaped structure and comprises a torsion bar, which is aligned substantially in the vehicle's transverse direction in the installed state and which is made of a fiber-composite material, as well as two stabiliser limbs, which are aligned in the vehicle's longitudinal direction in the installed state and arranged rotationally fixed at the axial ends thereof.

Due to the previously described design of the torsion bar and production of the stabiliser according to the method already described, a simple and particularly economical production of the stabiliser is ensured in an advantageous manner, in addition to a low component weight of the stabiliser and an operationally-safer connection between the torsion bar and stabiliser limb components.

To ensure an especially low component weight, it is provided according to a preferred embodiment of the stabiliser that the torsion bar is formed as a hollow cylinder and that the stabiliser limbs are formed from a light metal alloy, particularly an aluminum alloy.

BRIEF DESCRIPTION OF THE DRAWINGS

Further advantages and application options of the invention result from the following description in conjunction with the exemplary embodiment shown in the drawing.

The following is shown.

DETAILED DESCRIPTION

Figure 1:
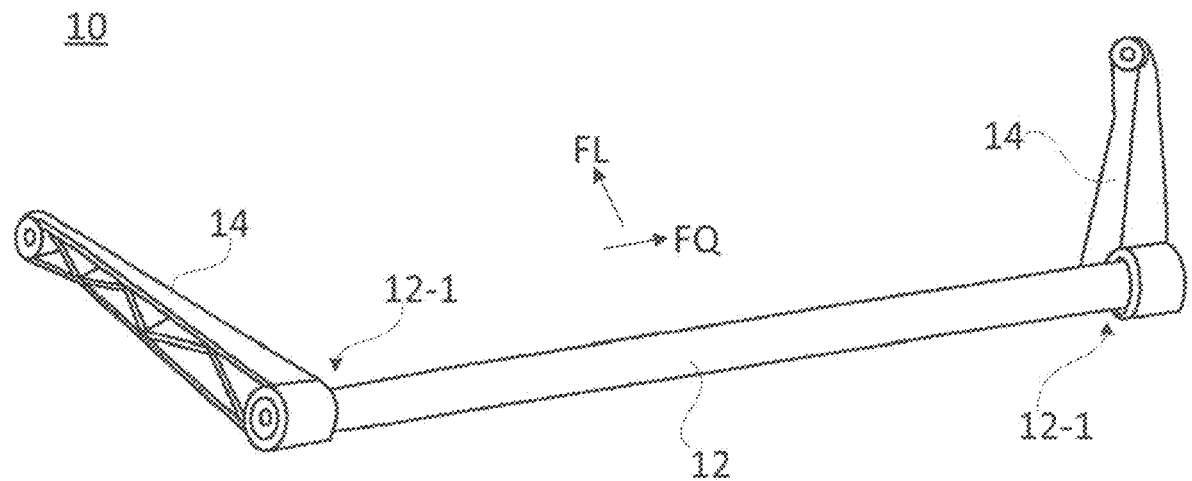
FIG. 1 a stabiliser for motor vehicle.

FIG. 1 shows a stabiliser for a motor vehicle characterized as a whole with reference numeral 10.

The stabiliser 10 has a substantially U-shaped structure and comprises a torsion bar 12, which is aligned substantially in the vehicle's transverse direction FQ in the installed state, as well as two stabiliser limbs 14, which are aligned in the vehicle's longitudinal direction FL in the installed state and arranged rotationally fixed at the axial ends 12-1 thereof.

To ensure the lowest weight possible, the torsion bar 12 is hollow-cylindrical here and formed from a fiber-composite material, and the stabiliser limbs 14 are produced from an aluminum alloy.

Figure 2:
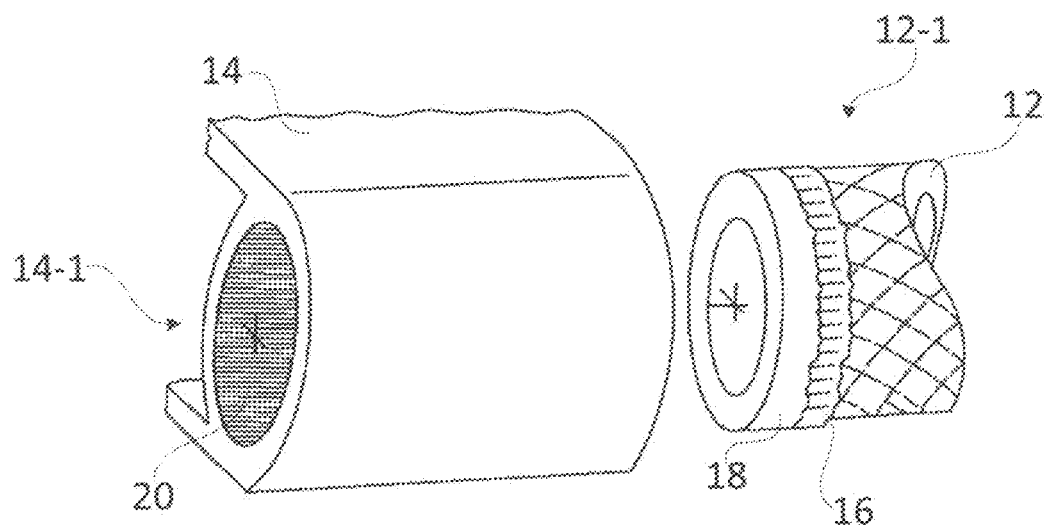
FIG. 2 an enlarged view of an axial end of the torsion bar of the stabiliser and a section of the stabiliser limb having a hub bore before joining of the components.

As shown in FIG. 2, in order to produce the rotationally fixed connection, the sectionally shown stabiliser limb 14 has a hub bore 14-1, into which the indicated axial end 12-1 of the torsion bar can be inserted.

As further shown in FIG. 2, the torsion bar 12 in this case is coated with an adhesive coating 16 and a protective layer 18 completely covering the adhesive coating 16, in the area of the torsion bar's sectionally indicated axial end 12-1.

The adhesive coating 16, which is formed as a solid layer, i.e. the adhesive coating 16 is present in a solid physical state, is formed as a reactive hot-melt adhesive here, which can be activated by the corresponding supply of heat.

Figure 3A:
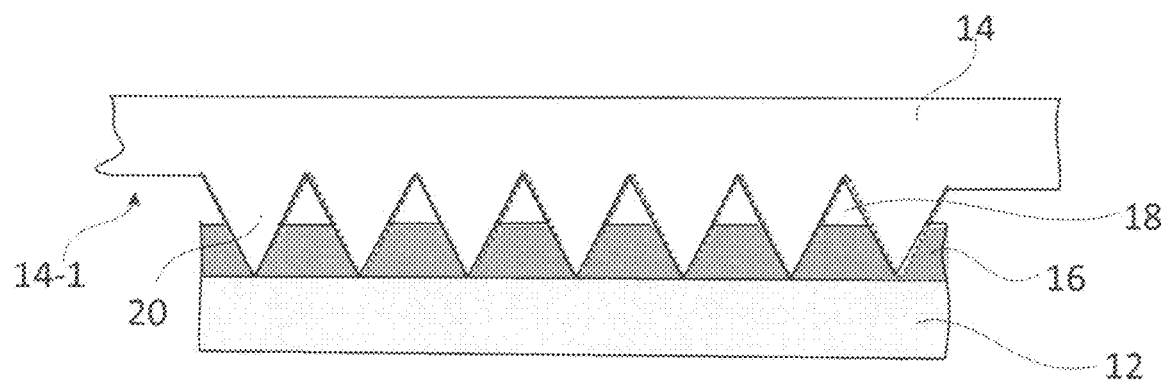
FIG. 3a a schematic, enlarged view of the joining area directly after joining.

As FIG. 2 further shows, the hub bore 14-1 has inner toothing 20. As particularly shown in FIG. 3a, the hub bore 14-1 and/or the inner toothing 20 and the outer diameter of the axial end 12-1 in this case are dimensioned in the fit thereof such that, during joining, i.e. during the axial insertion of the indicated end 12-1 into the hub bore 14-1, the teeth of the inner toothing 20 cut an external-tooth-like contour into the protective layer 18 and, in doing so, remove the protective layer 18 at least partially such that areas of the inner toothing 20 have direct contact with the adhesive coating 16.

Due to the external-tooth-like contour now carved into the protective layer 18, a form-fitting connection is formed between the torsion bar 12 and stabiliser limb 14 components after joining.

Figure 3B:
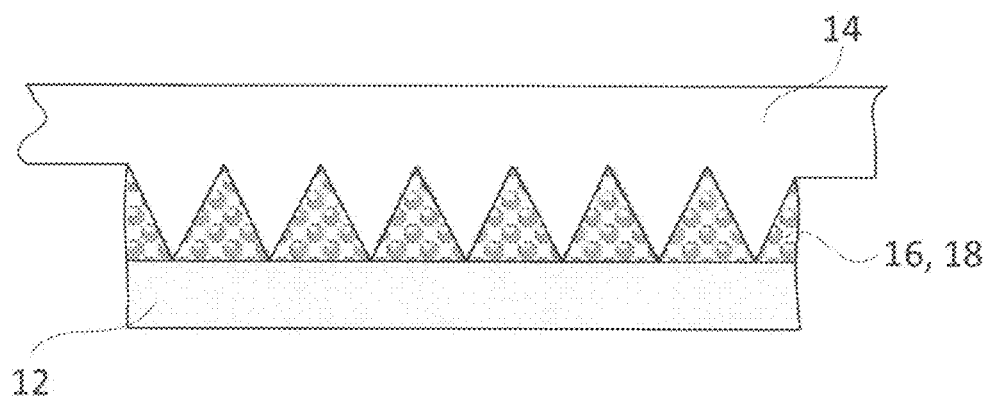
FIG. 3b the joining area from FIG. 3a after curing of the adhesive layer.

The adhesive-bond connection between the components is established after activation of the adhesive coating 16, i.e. through the supply of heat in this case. To this end, the now-joined stabiliser 10 can also be swapped out so that the reaction can take place completely. The situation after curing is schematically shown in FIG. 3b.

It has proven to be particularly advantageous in this case that an interruption-free and thus rapid production of the stabiliser 10 is enabled due to the formation of the adhesive coating 16 in the form of a solid layer, i.e. the adhesive coating 16 is present in the solid physical state, because, in contrast to the prior art, liquid adhesive erosion does not occur such that the interruption in production for the removal of the liquid adhesive erosion according to the prior art is no longer necessary. A further advantage is that a cleaner production and thus particularly also a DIN-certifiable production of the stabiliser 10 is enabled due to the elimination of the liquid adhesive erosion.

The invention claimed is:

1. A torsion bar for a stabiliser of a motor vehicle, on axial ends of which a respective stabiliser limb can be attached rotationally fixed,
    wherein, in a region of the axial ends thereof, the torsion bar is coated with an adhesive coating and a protective layer covering the adhesive coating, wherein the adhesive coating is formed as a solid adhesive coating that can be activated after at least partial removal of the protective layer.

2. The torsion bar according to claim 1, wherein the adhesive coating comprises polyurethanes, silicones, MS polymers, epoxide resins, rubber, and/or acrylate as an adhesive component.

3. The torsion bar according to claim 1, wherein the adhesive coating is in the form of a multi-component adhesive, wherein at least one component of the multi-component adhesive is present in microencapsulated form.

4. The torsion bar according to claim 2, wherein the adhesive component can be activated by means of bursting of a microcapsule, heat input, solvent, and/or moisture.

5. A method to produce a stabiliser for a motor vehicle comprising the following steps:
provision of a torsion bar for the stabiliser of a motor vehicle, on axial ends of which a respective stabiliser limb can be attached rotationally fixed, wherein, in a region of the axial ends thereof, the torsion bar is coated with an adhesive coating and a protective layer covering the adhesive coating, wherein the adhesive coating is formed as a solid adhesive coating that can be activated after at least partial removal of the protective layer;
provision of two stabiliser limbs each having a hub bore;
joining of the torsion bar with the stabiliser limbs by inserting the axial ends of the torsion bar into the hub bores of the stabiliser limbs, wherein the hub bores and the axial ends of the torsion bar are dimensioned to fit such that the protective layer covering the adhesive coating is at least partially removed during insertion; and
activation of the at least partially exposed adhesive coating.

6. The method for producing a stabiliser according to claim 5, wherein material erosion of the protective layer occurring during insertion is suctioned off.

7. The method for producing a stabiliser according to claim 5, wherein a form-fitting connection is additionally established between the torsion bar and the stabiliser limbs during joining.

8. The method for producing a stabiliser according to claim 7, wherein the hub bore of the stabiliser limbs has inner toothing, by means of which an external-tooth-like contour is cut into the protective layer during joining.

9. The method for producing a stabiliser according to claim 8, wherein the hub bore of the stabiliser limb has inner toothing and that the protective layer is provided with an external-tooth-like contour corresponding thereto, wherein the inner toothing and the external-tooth-like contour are dimensioned such that the protective layer is removed by the tooth tips of the inner toothing in the area between two teeth of the external-tooth-like contour during joining.

10. The method for producing a stabiliser according to claim 5, wherein an adhesive component of the adhesive coating is activated by means of bursting of a microcapsule, heat input, solvent, and/or moisture.

11. A stabiliser for a motor vehicle, comprising a torsion bar, which is aligned in the motor vehicle's transverse direction (FQ) in an installed state and which is formed from a fiber-composite material, on axial ends of which a respective stabiliser limb is arranged, which is aligned in the vehicle's longitudinal direction (FL) in the installed state and attached rotationally fixed,
wherein, in the region of the axial ends thereof, the torsion bar is coated with an adhesive coating and a protective layer covering the adhesive coating, wherein the adhesive coating is formed as a solid adhesive coating that can be activated after at least partial removal of the protective layer.

12. The stabiliser according to claim 11, wherein the torsion bar is formed as a hollow cylinder.

13. The stabiliser according to claim 11, wherein that the stabiliser limbs are formed from a light metal alloy.

14. The torsion bar according to claim 2, wherein the adhesive coating is in the form of a multi-component adhesive, wherein at least one of the adhesive components is present in microencapsulated form.

15. The torsion bar according to claim 2, wherein the adhesive component can be activated by means of bursting of a microcapsule, heat input, solvent, and/or moisture.

16. The torsion bar according to claim 3, wherein at least one component of the multi-component adhesive can be activated by means of bursting of a microcapsule, heat input, solvent, and/or moisture.

17. A method to produce a stabiliser for a motor vehicle comprising the following steps:
provision of a torsion bar according to claim 2;
provision of two stabiliser limbs each having a hub bore;
joining of the torsion bar with the stabiliser limbs by inserting the axial ends of the torsion bar into the hub bores of the stabiliser limbs, wherein the hub bores and the axial ends of the torsion bar are dimensioned in the fit thereof such that the protective layer covering the adhesive coating is at least partially removed during insertion; and
activation of the at least partially exposed adhesive coating.

18. A method to produce a stabiliser for a motor vehicle comprising the following steps:
provision of a torsion bar according to claim 3;
provision of two stabiliser limbs each having a hub bore;
joining of the torsion bar with the stabiliser limbs by inserting the axial ends of the torsion bar into the hub bores of the stabiliser limbs, wherein the hub bores and the axial ends of the torsion bar are dimensioned in the fit thereof such that the protective layer covering the adhesive coating is at least partially removed during insertion; and
activation of the at least partially exposed adhesive coating.

19. A method to produce a stabiliser for a motor vehicle comprising the following steps:
provision of a torsion bar according to claim 4;
provision of two stabiliser limbs each having a hub bore;
joining of the torsion bar with the stabiliser limbs by inserting the axial ends of the torsion bar into the hub bores of the stabiliser limbs, wherein the hub bores and the axial ends of the torsion bar are dimensioned in the fit thereof such that the protective layer covering the adhesive coating is at least partially removed during insertion; and
activation of the at least partially exposed adhesive coating.

20. The method for producing a stabiliser according to claim 6, wherein a form-fitting connection is additionally established between the torsion bar and the stabiliser limbs during joining.

* * * * *